United States Patent
Jin et al.

(10) Patent No.: US 9,572,004 B2
(45) Date of Patent: Feb. 14, 2017

(54) SYSTEM AND METHOD FOR FAST ACCURATE DETECTION OF SMS SPAM NUMBERS VIA MONITORING GREY PHONE SPACE

(71) Applicant: AT&T INTELLECTUAL PROPERTY I, LP, Atlanta, GA (US)

(72) Inventors: Yu Jin, Madison, NJ (US); Ann E. Skudlark, San Ramon, CA (US); Nan Jiang, Madison, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/079,577

(22) Filed: Mar. 24, 2016

(65) Prior Publication Data
US 2016/0205528 A1 Jul. 14, 2016

Related U.S. Application Data

(63) Continuation of application No. 14/268,025, filed on May 2, 2014, now Pat. No. 9,357,362.

(51) Int. Cl.
*H04W 4/26* (2009.01)
*H04W 4/14* (2009.01)
(Continued)

(52) U.S. Cl.
CPC .............. *H04W 4/26* (2013.01); *H04L 51/00* (2013.01); *H04L 51/12* (2013.01); *H04L 61/605* (2013.01);
(Continued)

(58) Field of Classification Search
CPC ..................................................... H04W 4/14
(Continued)

(56) References Cited

U.S. PATENT DOCUMENTS 6,101,393 A 8/2000 Alperovich et al.
6,643,359 B2 11/2003 Verbil et al.
(Continued)

FOREIGN PATENT DOCUMENTS

| EP | 1675330 B1 | 5/2007 |
| EP | 1988671 A1 | 11/2008 |
| WO | 2005119993 A1 | 12/2015 |

OTHER PUBLICATIONS

Jiang, N. et al., "'Greystar: Fast and Accurate Detection of SMS Spam Numbers in Large Cellular Networks Using Gray 1 Phone Space,'", 22nd USENIX Security Symposium, Aug. 14-16, 2013, Washington, D.C., https:l/www.usenix.org/conference/usenixsecurity13/technical-sessions/presentation/jiang, 17 pgs., 2013.
(Continued)

*Primary Examiner* — Thomas Lett
(74) *Attorney, Agent, or Firm* — Scott P. Zimmerman, PLLC

(57) ABSTRACT

A method and system for identifying short message service (SMS) spammers identifies senders as spammers by determining that the senders are sending SMS messages to devices included in a grey phone space. Devices in the grey phone space are identified using various methods including an analysis of call detail records. A grey ratio for a sender is determined as a ratio of messages sent to grey phone numbers by the sender to messages sent to all phone numbers by the sender. A sender is identified based on a difference between the grey ratio for the sender and a second grey ratio being above a threshold.

20 Claims, 3 Drawing Sheets

(51) Int. Cl.
H04L 29/12 (2006.01)
H04W 4/00 (2009.01)
H04L 12/58 (2006.01)
H04L 29/06 (2006.01)

(52) U.S. Cl.
CPC ....... H04L 61/6054 (2013.01); H04L 63/1441 (2013.01); H04W 4/005 (2013.01); H04W 4/14 (2013.01); H04L 61/6004 (2013.01); H04L 61/6018 (2013.01)

(58) Field of Classification Search
USPC ........................................................ 455/406
See application file for complete search history.

(56) References Cited

U.S. PATENT DOCUMENTS

| | | | |
|---|---|---|---|
| 6,819,932 | B2 | 11/2004 | Allison et al. |
| 7,145,875 | B2 | 12/2006 | Allison et al. |
| 7,929,980 | B2 | 4/2011 | Deng et al. |
| 8,190,686 | B2 | 5/2012 | Qutub et al. |
| 8,443,446 | B2 | 5/2013 | Lamastra et al. |
| 8,539,579 | B2 | 9/2013 | Chen et al. |
| 9,143,907 | B1 * | 9/2015 | Caldwell ................. H04W 4/14 |
| 9,232,373 | B1 * | 1/2016 | Caldwell ................. H04W 4/14 |
| 9,294,890 | B1 * | 3/2016 | Boutcher ................ H04W 4/14 |
| 2007/0028301 | A1 | 2/2007 | Shull et al. |
| 2007/0233861 | A1 | 10/2007 | Cai et al. |
| 2008/0155693 | A1 | 6/2008 | Mikan et al. |
| 2012/0131324 | A1 | 5/2012 | Ansari et al. |
| 2013/0059571 | A1 | 3/2013 | King, II et al. |
| 2014/0004892 | A1 | 1/2014 | Murynets et al. |

OTHER PUBLICATIONS

Jiang, Nan et al., ""Understanding SMS Spam in a Large Cellular Network: Characteristics, Strategies and Defenses."", 2 Research in Attacks, Intrusions, and Defenses. Springer Berlin Heidelberg, 2013. 328-347. http://www-users.cs.umn.edu/-zhzhang/Papers/raid2013_jiang_spam.pdf, 2013.

Jin, Yu et al., ""Gray's anatomy: Dissecting scanning activities using IP gray space analysis."", Proceedings of the 2nd 3 US EN IX workshop on Tackling computer systems problems with machine learning techniques. US EN IX Association, 2007, http :1 /static. us en ix.org/events/sysml07 /tech/fu ll_papers/j in/jinhtml/, 5 pgs., 2007.

* cited by examiner

SYSTEM AND METHOD FOR FAST ACCURATE DETECTION OF SMS SPAM NUMBERS VIA MONITORING GREY PHONE SPACE

CROSS-REFERENCE TO RELATED APPLICATIONS

This application is a continuation of and claims priority to U.S. patent application Ser. No. 14/268,025, filed May 2, 2014 by Jin et al., entitled, "System and Method for Fast and Accurate Detection of SMS Spam Numbers Via Monitoring Grey Phone Space." The contents of each of the foregoing is/are hereby incorporated by reference into this application as if set forth herein in full.

FIELD OF THE DISCLOSURE

The present disclosure describes a system and method for detecting spammers by identifying phone numbers that should not receive SMS messages and the senders of such messages to the identified phone numbers.

In one embodiment, a method for identifying spammers includes identifying a plurality of grey phone numbers. Grey phone numbers are phone numbers associated with devices that are not expected to receive SMS messages. A plurality of call records are analyzed to determine a number of messages sent by a short message service sender to any of the plurality of grey phone numbers. A short message service sender is identified as a spammer based on the number of messages sent by the short message service sender to any of the plurality of grey phone numbers. In one embodiment, the analyzing a plurality of call records further comprises determining a specific grey ratio for the short message service sender as a ratio of short message service messages sent to the plurality of grey phone numbers by the short message service sender to short message service messages sent to all phone numbers by the short message service sender, and the identifying further based on identifying the short message service sender as a spammer based on the specific grey ratio compared to a second grey ratio for a legitimate short message service sender. In one embodiment, the identifying is further based on a difference between the specific grey ratio and the second grey ratio being above a threshold. The identifying, in one embodiment, is further based on the short message service sender sending messages to a number of unique terminating numbers. In one embodiment, the identifying a plurality of grey phone numbers comprises determining that a phone number is associated with one of a data only device and a machine-to-machine device. The determining that a phone number is associated with one of a data only device and a machine-to-machine device, in one embodiment, is based on an international mobile equipment identity number associated with a device having been assigned the phone number. In one embodiment, the identifying a plurality of grey phone numbers, the analyzing a plurality of call records, and the identifying the short message service sender as a spammer are performed periodically.

An apparatus and computer readable medium for detecting spammers by identifying phone numbers that should not receive SMS messages and callers who send messages to the identified phone numbers is also disclosed herein.

BACKGROUND OF THE DISCLOSURE

The present disclosure relates generally to telecommunications, and more particularly to fast and accurate detection of SMS spam numbers via monitoring grey phone space.

The increase in use of mobile devices has brought with it an onslaught of unwanted Short Message Service (SMS) spam. It has been reported that the number of spam messages in the US increased 45% in 2011 to 4.5 billion messages. In 2012, according to some reports, more than 69% of the mobile users received text spam. The vast amount of SMS spam not only results in an annoying customer user experience but a significant cost to cellular service providers and customers.

One approach adopted by mobile carriers to identify unwanted SMS is based on user spam reports. In particular, users forward spam messages to short code 7726 (which corresponds to letters on telephone keypads and forms the word "SPAM" on most phones). Carriers then confirm these reported spam numbers and restrict them from future SMS activities. This method, however, suffers from low user report rate and user delays in reporting, resulting in significant detection delay. This method is also vulnerable to denial-of-service attacks since malicious users can game the system to disable legitimate users by sending fake spam reports to 7726. Other methods such as volumetrics used to detect spam numbers are often inapplicable in practice due to high false alarm rates, because many legitimate customers often exhibit similar SMS sending patterns, such as the numbers employed by schools, churches and other organizations for informing their members or subscribers of information. There are existing systems deployed at the Signaling System Number 7 (SS7) network to detect and filter spam messages by inspecting SMS message content and search for predefined spam signatures (e.g., keywords, strings or regular expressions). Nonetheless, spammers can evade detection by obfuscating text content. Some systems have been developed such as smartphone applications (referred to as apps) to classify spam messages on user mobile devices. However not all the devices, such as feature phones, support execution of such apps. In addition, many of those types of apps carry a large overhead which can drain battery power and reduce system resources. Furthermore, from a user's perspective this method is a late defense as the spam message has already arrived on a user's device. Depending on the user's message plan, the user may be charged for the message, become vulnerable to malware, and suffer the annoyance from receiving unsolicited and unwanted messages. Moreover, high volumes of spam messages may result in congestion and other impacts on network performance.

DETAILED DESCRIPTION OF THE DRAWINGS

The system and method for identifying short message service (SMS) spammers described herein is referred to as Greystar. Greystar detects spam numbers in a scalable, fast and accurate way, with minimum number of false positives in a manner so as to not disturb legitimate customers.

Greystar uses existing SMS call detail records (CDRs) that are typically collected for billing purposes and employs a concept of grey phone numbers to identify emerging spam activities. Grey phone numbers (also referred to as grey numbers), in one embodiment, are phone numbers associated with devices that are not expected to receive SMS messages. Grey phone numbers are, in one embodiment, associated with two types of mobile devices: data only devices (e.g., many laptop cards, eReaders and cellular data modems, etc.) and machine-to-machine (M2M) communication devices (e.g., point-of-sale machines, fleet tracking devices and utility meters, etc.) Because these grey numbers do not participate actively in regular SMS communication as other mobile numbers do, they form a grey territory that legitimate mobile users rarely enter. In other words, numbers that access grey numbers may likely be spam numbers. On the basis of the grey phone space, Greystar employs a statistical classification algorithm to detect spam numbers, in one embodiment, based on their interactions with the grey phone numbers and other regular numbers.

Figure 1:
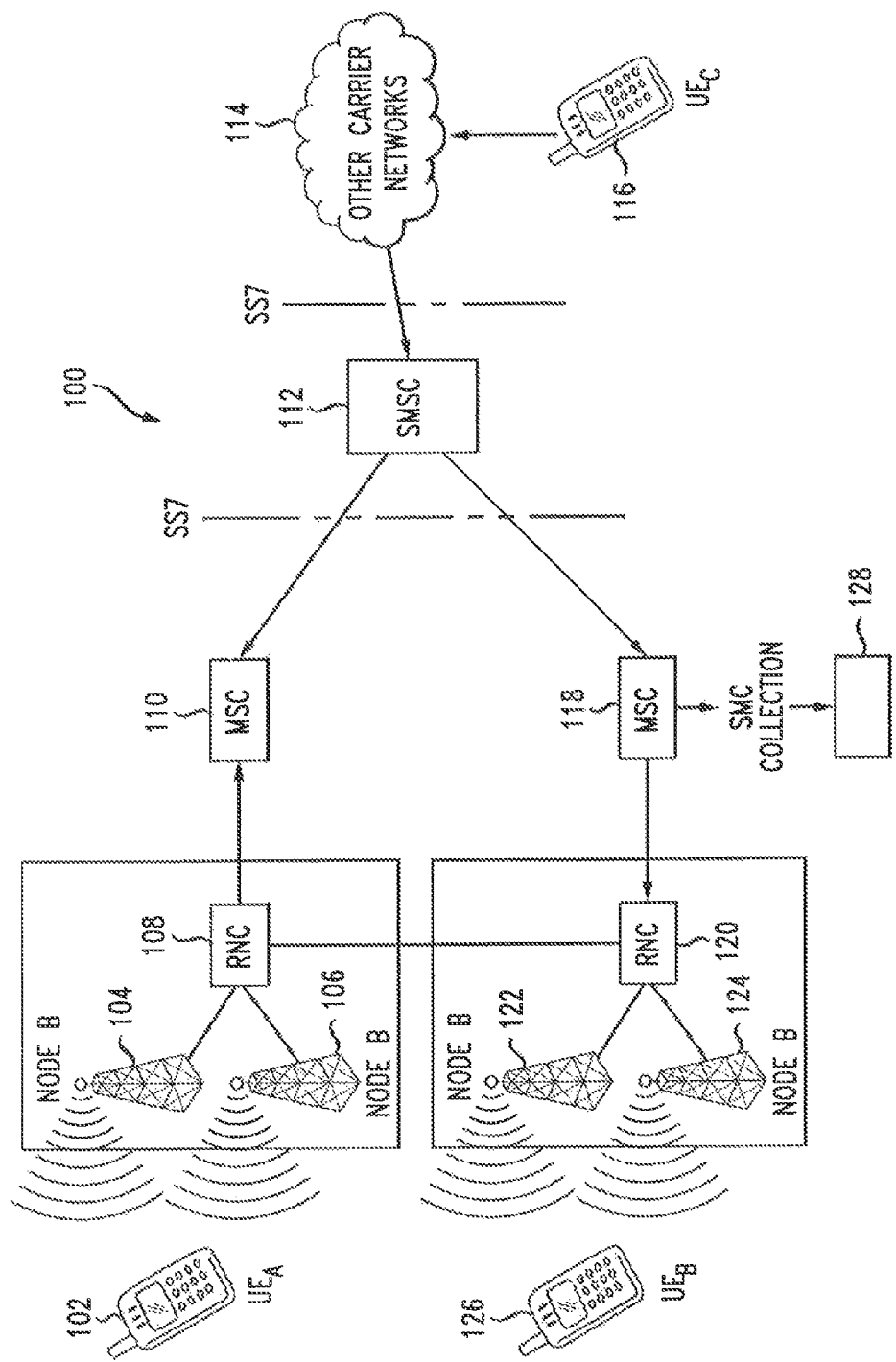
FIG. 1 shows a network in which the method and apparatus for identifying SMS spammers is used according to one embodiment.

In one embodiment, Greystar is used in a cellular network that utilizes a Universal Mobile Telecommunications System (UMTS), which is a popular third generation (3G) mobile communication technology adopted by many mobile carriers. In other embodiments, Greystar can be used in other types of networks. FIG. 1 depicts system 100 having an architecture for delivering SMS messages inside UMTS networks. When sending an SMS message, end user equipment (e.g., UE A 102) directly communicates with one of cell towers 104, 106 (a cell tower is also referred to as a node-B), which forwards the message to a Radio Network Controller (e.g., RNC 108). RNC 108 transmits the message to Mobile Switching Center (MSC) server (e.g., MSC 110), where the message enters the Signaling System 7 (SS7) network and is stored at Short Messaging Service Center (SMSC), shown in FIG. 1 as SMSC 112. From SMSC 112, the message is routed to the serving MSC, in this example MSC 118 of the recipient (UE B 126), then to the serving RNC 120 and one of node-B 122,124, and finally reaches UE B 126. Similarly, messages originating from other carrier networks, (e.g., from UE C 116 via network 114) will also traverse the SS7 network and serving MSC 112 before arriving at UE B 126. It should be noted that similar SMS architecture is also adopted in other types of 3G/4G cellular networks. Greystar system 128 is shown in FIG. 1 receiving information, namely call records, from MSC 118 according to one embodiment. It should be noted that Greystar 128 may be in communication with other devices to receive call records and additional information. In addition, although the examples and embodiments described herein focus on SMS through a voice control channel, similar defenses for fighting email spam can be readily applied to defend against short message spam through data channels and other short message services through mobile data channels, such as iMessage, Tweets and MMS, etc.

Information used for determining grey phone numbers and SMS spammers consists, in one embodiment, of SMS Call Detail Records (CDRs) and User spam reports. SMS CDRs are used for understanding SMS user/spammer activities and evaluating the performance of the Greystar system. These records, in one embodiment, are collected at the serving MSC's of the SMS recipients (e.g., MSC 110, 118 of FIG. 1) and may be transmitted to Greystar 128 directly or via MSC 118 as shown in FIG. 1. This means that these collected records represent SMS messages targeting active mobile customers (i.e., the ones that are currently connected to the network) and have been successfully routed through the SS7 network. Each record contains an SMS receiving time, an originating number, a terminating number and an International Mobile Equipment Identity (IMEI) for a device associated with a terminating number. User spam reports, in one embodiment, contain spam messages reported by mobile users to a carrier. In one embodiment, a cellular service provider deploys an SMS spam reporting service for its users: when a user receives an SMS text and deems it's a spam message, the user can forward the message to a spam report number designated by the cellular service provider. Once the spam is forwarded, an acknowledgment message is returned, which asks the user to reply with the spammer's phone number (also referred to as the spam number). Once the above two-stage process is completed within a pre-defined time interval, a spam report is created, which includes the reporter's phone number, the spammer's phone number, the reporting time and the content of the reported spam message.

Although user spam reports provide a list of known spam numbers, user spam reports are not comprehensive and can be noisy. Therefore, in one embodiment, a different source to obtain ground truth is utilized. In particular, fraud agents from a UMTS carrier are used to manually verify spam number candidates detected. The fraud agents use more comprehensive sources of information. For example, fraud agents can investigate the ownership and the price plan information of spam candidates, examine their SMS sending patterns and correlate them with known spam numbers in terms of their network locations and active times, etc. The final decision is made conservatively by corroborating different evidence. However, in one embodiment, fraud agents provide a reasonably authoritative ground truth. It has been determined that such a manual investigation process deployed for more than one year has generated no observable false alarms. Therefore, in one embodiment, fraud agents are treated as the authority for verifying spam numbers. That is, a list of spam number candidates is submitted to fraud agents and the fraud agents return a list of confirmed spam numbers.

Greystar, in one embodiment, is a crowdsourcing method (i.e., it relies on indicators from spam recipients to alert emerging spam activities.) However, Greystar is a passive crowdsourcing method. Greystar is passive in that it does not depend on SMS recipients to submit reports regarding received spam messages. Rather, it selects a set of mobile phone numbers with certain characteristics, which are referred to as grey numbers, and callers sending SMS to these grey numbers can be used to determine the existence of spamming activities. Greystar monitors the footprints of spammers on these grey numbers in order to detect spam numbers. The passive crowdsourcing method used by Greystar addresses the problems in the existing active crowdsourcing solution using user spam reports. First, the population of grey numbers is much larger and increasing over time, providing more "spam alerts" to capture more spam numbers more quickly. Second, by passively monitoring SMS communication with grey numbers, user delay introduced when spam reports are submitted is avoided. Last, passive crowdsourcing aids in avoiding errors in active spam reports and assists in preventing malicious users from gaming the detection system and launching denial-of service (DoS) attacks on other legitimate users.

SMS spamming activities are defined as follows. During a spamming process, a spammer selects (following a certain strategy) a sequence of target phone numbers, $X:=\{x_1, x_2, \ldots, x_t, \ldots\}$ ($1 \le t \le T$), to send SMS messages to over time T. Each target phone number is a concatenation of two components, the 3-digit area code $x_t^a$ ($a \in A$), which is location specific, and the 7-digit subscriber number $x_t^s$, where $0 \leq x_t^s \leq 10^7$. In the examples that follow, only US phone numbers (which have 10 digits excluding the country code "1") are used and phone numbers from other countries following the same North American Numbering Plan (NANP) are removed. The statistics used in the following examples are calculated based on data from one month. To compare the activities of spam numbers and regular numbers, a same number of random samples from each group is obtained. In particular, the spam numbers are identified from user spam reports and the regular users are randomly sampled from all the remainder of users appearing in the month-long CDR data set. The samples of both spam numbers and regular numbers are investigated by fraud agents to remove false positives and false negatives.

In one embodiment, grey phone space is identified as follows. Information identifying a device associated with each phone number is readily available in the CDR data, which can be identified based on the first eight-digit TAC of inside the International Mobile Equipment Identity or IMEI. TAC identifies a particular model (and often revision) of wireless devices for use on a GMS, UMTS or other IMEI-supporting wireless networks. A manufacturer can request an eight-digit Type Allocation Code for a new phone model from the international GSM standards body to identify that device. The remaining six digits in IMEI identify a particular device from that phone model. A TAC to device mapping from a UMTS carrier is used to identify 27 mobile device types (defined by the carrier) which is summarized as follows. Data-only types comprise, for example, laptop cards, tablets, netbooks, eReaders, 3G data modems, etc. M2M types comprise, for example, security alarms, telematics, fleet tracking devices, point-of-sale terminals, medical devices, etc. Phone types, comprise, for example, smartphones, feature phones, quick messaging phones, personal digital assistants, etc. It should be noted that a finer grained analysis at individual device level may also be performed. However, it has been determined that, except for the GPS devices, devices within each type have strong similarity in their SMS activeness distributions. As such, there is little to be gained by defining grey numbers at the device level.

The design of Greystar, in one embodiment, is based on observations pertaining to spammer activities. The logic of Greystar is illustrated in Algorithm 1, which, in one embodiment, is executed at a predefined frequency.

Algorithm 1 Graydar algorithm.

1: Input: SMS records D from the past T hours, T = 24 hours, M=50
2: Output: Spam number candidates C;
3: From D, identify a set of numbers Orig who send SMS to gray numbers;
4: for Each SMS sender s ∈ Orig do
5:   Extract the records associated with s: $D_s \in D$;
6:   From $D_s$, identify the gray TNs $G_s$ and normal TNs $N_s$ accessed by s;
7:   if $|G_s| + |N_s| < M$ and $|G_s| > 0$ then
8:     continue;
9:   end if
10:  if Crowdsource($G_s$, $F_s$)=1 then
11:    C := C∪{s};
12:  end if
13: end for In one embodiment, the algorithm is run hourly but could be run periodically over a different time period. Greystar employs a time window of T (e.g., T equals 24 hours in this example). The footprints of SMS originating numbers, e.g., the sets of normal and grey numbers accessed ($G_s$ and $N_s$), are identified for each sender within T Next, a filter process is conducted which places two requirements on originating numbers to be classified. The two requirements, in one embodiment, are that in the past X hours: 1) the originating number has been active enough (e.g., the originating number has sent messages to no less than M=100 recipients in the past X hours, based on the high SMS sending rate exhibited by known spam numbers) and 2) the originating number has contacted or attempted to contact at least one grey number. In one embodiment, X is 24 hours. These two criteria, especially the second one, can help significantly reduce the candidates to be classified in the follow up step. Research has shown that, on average, only less than 0.1% of users send SMS to grey numbers in each day. More importantly, these users cover a majority of active SMS spammers in the network. Therefore, the filtering step noticeably reduces the system load as well as potential false alarms. Once a sender passes the filtering process, the function crowdsource is called to classify the sender into either a spam number or a normal number by investigating the footprints of the sender (i.e., the grey numbers and normal numbers it has accessed). In one embodiment, a Beta-Binomial model for building the crowdsource function is used.

A design of a classifier, according to one embodiment, is as follows. In one embodiment, it is assumed that target selection of a random spammer follows a two-step process. First the spammer chooses a specific target phone number block (or the entire phone space for the random spammer). Second, the spammer uniformly chooses target phone numbers from the block. Let $\theta$ denote the density of grey numbers in the target block and $X := \{x_i\}$, $1 \leq i \leq n$ be the sequence of target phone numbers. Meanwhile, let k be the number of grey phone numbers in X. The target selection process can then be formulated as the following generative process:

1. Choose a block with $\theta$; and
2. Choose $x_i \sim$ Bernoulli($\theta$), $1 \leq i \leq n$;

It should be noted that $\theta$ varies as a spammer targets different phone number blocks. The choice of phone number blocks can be arbitrary. For example, a spammer can choose a large phone block across multiple area codes or a small one with only a fraction of phone numbers in an area code. Therefore, $\theta$ itself can be considered as a random variable. We assume $\theta$ follows a Beta distribution, i.e., $\theta \sim$ Beta($\alpha, \beta$), with a probability density function as:

$$P(\theta | \alpha, \beta) = \frac{\Gamma(\alpha + \beta)}{\Gamma(\alpha)\Gamma(\beta)} \theta^{\alpha}(1-\theta)^{\beta},$$

where $\Gamma$ is the gamma function. Therefore, the random variable k follows a Beta-binomial distribution:

$$P(k | n, \alpha, \beta) = \binom{n}{k} \frac{\Gamma(k+\alpha)\Gamma(n-k+\beta)}{\Gamma(n+\alpha+\beta)} \frac{\Gamma(\alpha+\beta)}{\Gamma(\alpha)\Gamma(\beta)}$$

It should be noted that in Bayesian inference, the Beta distribution is the conjugate prior probability distribution for the Bernoulli and binomial distributions. In one embodiment, instead of using the Bernoulli model, the second stage of the target selection process can be modeled as sampling from a multinomial distribution corresponding to different device types. In this embodiment, the conjugate prior distribution of the multinomial parameters is the Dirichlet distribution. However, preliminary experiments show little performance gain from applying the more sophisticated model in comparison to the increased cost in computation.

In one embodiment, the target selection process of normal users is expressed with the same process. Because normal users tend to communicate more with non-grey numbers, their corresponding $\theta^n$'s are usually much smaller. Let $\alpha^n$ and $\beta^n$ be the parameterization of the Beta distribution associated with $\theta^n$. For a number that has accessed n targets, out of which k are grey numbers, we classify it as a spam number when $$\frac{P(\text{spammer}|k,n)}{P(\text{normal}|k,n)} \bigg| = \frac{P(k|n,\alpha,\beta)P(\text{spammer})}{P(k|n,\alpha^n,\beta^n)P(\text{normal})} > 1,$$

where the first equation is derived using Bayes theorem. It is equivalent to $$\frac{P(k|n,\alpha,\beta)}{P(k|n,\alpha^n,\beta^n)} > \frac{P(\text{normal})}{P(\text{spammer})} = \eta$$

In practice, it is usually unclear how many spammers are in the network, therefore to obtain a direct estimate of $\eta$ is challenging. Instead, in one embodiment $\eta$ is chosen using cross validation on training data.

There are five parameters to be estimated in the model above, $\alpha, \eta, \alpha^n, \beta^n$ and $\eta$. In one example, we use the data from one month to determine the model. To obtain ground truth, a list of all the telephone numbers that have sent messages to more than 50 recipients in a 24 hour time window among which at least one is grey (see Algorithm 1) is submitted to the fraud agents. Fraud agents carry out investigation on these numbers and confirm spam numbers in the list. The month of data is then divided into two subsets, the first two weeks of data for fitting the model (i.e., to determine the first four parameters) and the rest of data is reserved for testing the model to estimate $\eta$.

Figure 2:
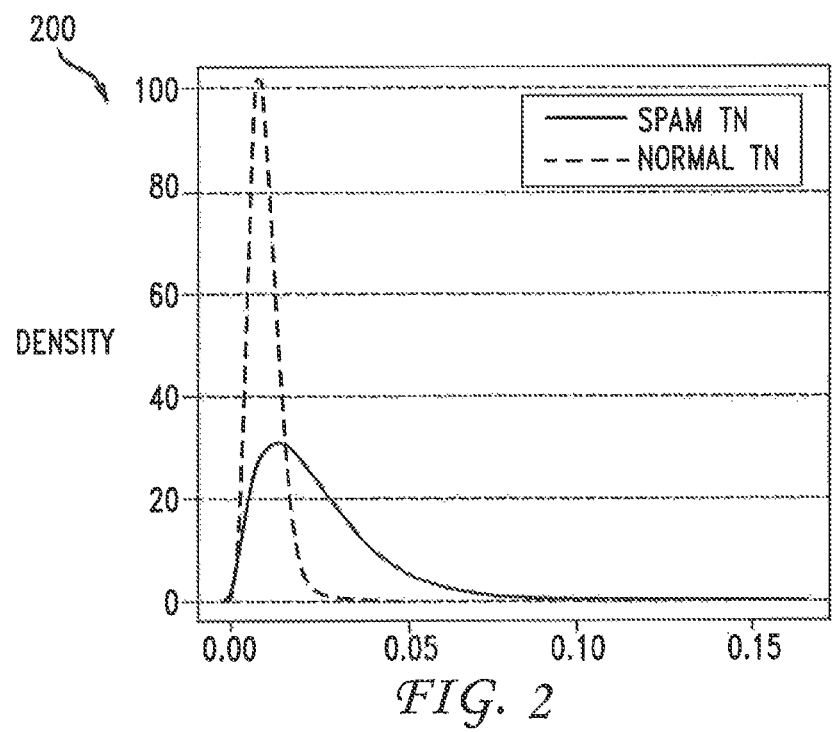
FIG. 2 depicts a chart illustrating the probability density function.

In particular, using the training data set, the parameters $\alpha$'s and $\beta$'s are estimated using maximum likelihood estimation. With the fitted parameters, the probability density function $\theta \sim \text{Beta}(\alpha,\beta)$ and $\theta \sim \text{Beta}(\alpha^n,\beta^n)$ is illustrated in chart 200 of FIG. 2. The mass of the probability function corresponding to the normal users concentrates on a narrow region close to 0, implying that the grey numbers that a normal user communicate with is much less than the non-grey numbers. In contrast, the curve associated with spam numbers widely spreads out, indicating more grey numbers are likely to be touched by spam numbers given their employed random target selection strategies.

Figure 3:
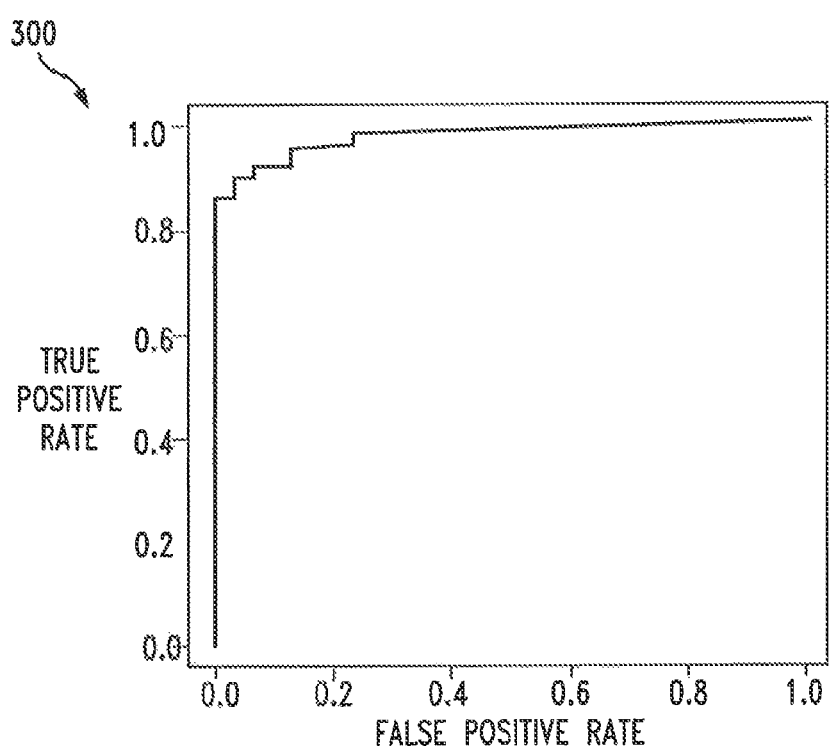
FIG. 3 depicts a chart illustrating an accuracy of a model evaluated given different choices of $\eta$ on the test data set.

The accuracy of the model is evaluated given different choices of $\eta$ on the test data set and the result is displayed in chart 300 of FIG. 3. The x-axis represents the false alarm rate (or the false positive rate) and the y-axis stands for the true detection rate (or the true positive rate). From FIG. 3, with a certain $\eta$, Greystar can detect more than 85% spam numbers without producing any false alarm.

Figure 4:
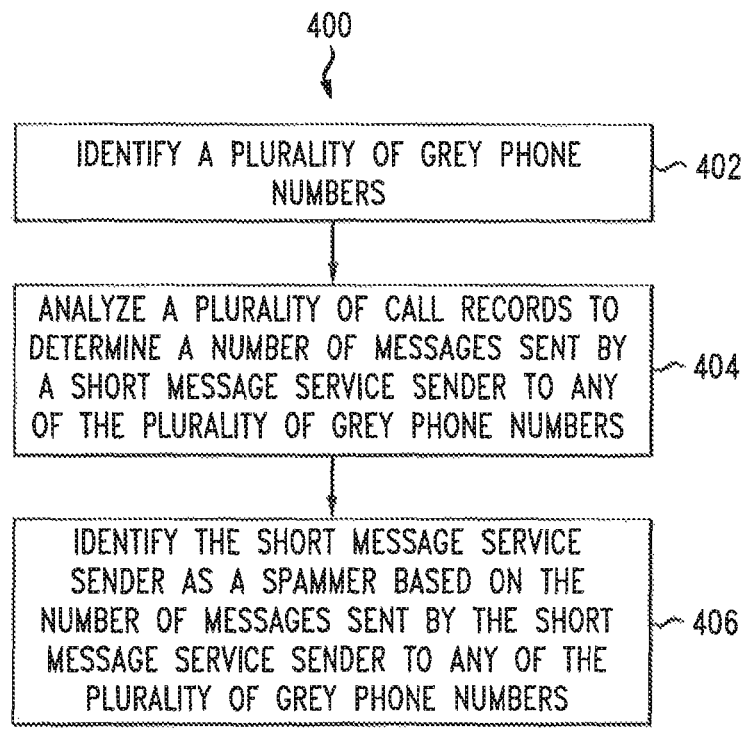
FIG. 4 depicts a flow chart of a method for identifying spammers according to one embodiment.

FIG. 4 depicts a flow chart of a method 400 for identifying spammers according to one embodiment. In one embodiment, method 400 is performed at Greystar 128 shown in FIG. 1. Returning to FIG. 4, at step 402, a plurality of grey phone numbers is identified. The identification of the plurality of phone numbers can be accomplished using one or more of the methods described previously. For example, statistical classification algorithms are used, in one embodiment, to identify a plurality of grey phone numbers. At step 404, a plurality of call records is analyzed to determine a number of messages sent by a short message service sender to any of the plurality of grey phone numbers. In one embodiment, call records over one of various time periods are analyzed to determine how many messages were sent by a short message service sender to any of the grey phone numbers. Since the devices associated with grey phone numbers do not typically receive messages from short message service senders, a short message service sender sending a message to a grey device may potentially be a spammer. However, since it is possible for a grey phone number to receive a short message service message from a non-spammer, in one embodiment, a single message from a short message service sender is not considered enough to classify the short message service sender as a spammer. At step 406, the short message service sender is identified as a spammer based on the number of messages sent by the short message service sender to any of the plurality of grey phone numbers. Various additional data, information, or methods of analysis may augment one or more of the steps of method 400. In one embodiment, the analyzing a plurality of call records further comprises determining a specific grey ratio for the short message service sender as a ratio of short message service messages sent to the plurality of grey phone numbers by the short message service sender to short message service messages sent to all phone numbers by the short message service sender, and the identifying further based on identifying the short message service sender as a spammer based on the specific grey ratio compared to a second grey ratio for a legitimate short message service sender. In one embodiment, the identifying is further based on a difference between the specific grey ratio and the second grey ratio being above a threshold. The identifying, in one embodiment, is further based on the short message service sender sending messages to a number of unique terminating numbers. In one embodiment, the identifying a plurality of grey phone numbers comprises determining that a phone number is associated with one of a data only device and a machine-to-machine device. The determining that a phone number is associated with one of a data only device and a machine-to-machine device, in one embodiment, is based on an international mobile equipment identity number associated with a device having been assigned the phone number. In one embodiment, the identifying a plurality of grey phone numbers, the analyzing a plurality of call records, and the identifying the short message service sender as a spammer are performed periodically.

Figure 5:
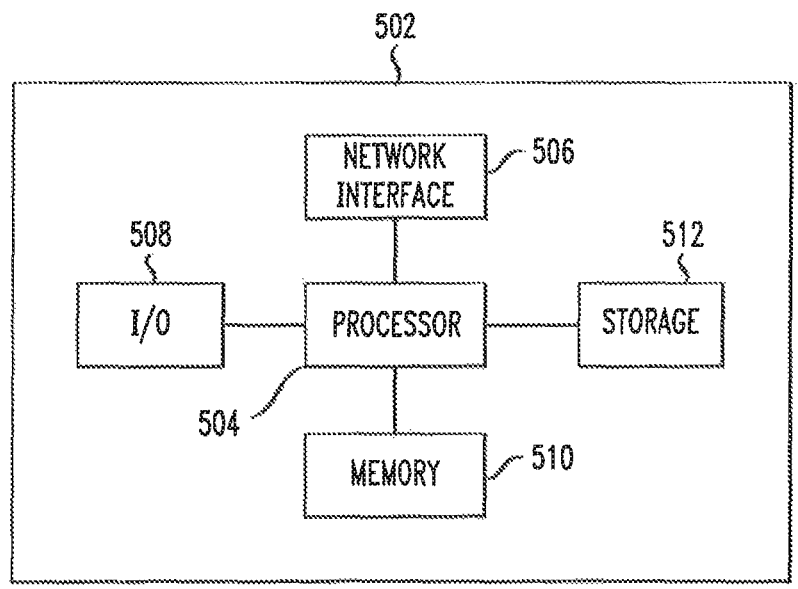
FIG. 5 depicts a high-level block diagram of a computer for identifying spammers according to one embodiment.

Greystar system 128 shown in FIG. 1, as well as each of the devices shown in FIG. 1 (e.g., SMSC 112, MSC 110,118, UE A 102, etc.) may each be implemented using a computer. A high-level block diagram of such a computer is illustrated in FIG. 5. Computer 502 contains a processor 504 which controls the overall operation of the computer 502 by executing computer program instructions which define such operation. The computer program instructions may be stored in a storage device 512, or other computer readable medium (e.g., magnetic disk, CD ROM, etc.), and loaded into memory 510 when execution of the computer program instructions is desired. Thus, the method steps of FIG. 4 can be defined by the computer program instructions stored in the memory 510 and/or storage 512 and controlled by the processor 504 executing the computer program instructions. For example, the computer program instructions can be implemented as computer executable code programmed by one skilled in the art to perform an algorithm defined by the method steps of FIG. 4. Accordingly, by executing the computer program instructions, the processor 504 executes an algorithm defined by the method steps of FIG. 4. The computer 502 also includes one or more network interfaces 506 for communicating with other devices via a network. The computer 502 also includes input/output devices 508 that enable user interaction with the computer 502 (e.g., display, keyboard, mouse, speakers, buttons, etc.) One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

What is claimed is:

1. A method comprising:
comparing, by a system including a processor, electronic records associated with an originating number of a short messaging service text message to entries in an electronic list of grey phone numbers, each grey phone number in the electronic list of grey phone numbers associated with a device lacking a capability to receive short messaging service text messages;
determining, by the system, a match between the electronic records and a grey phone number in the electronic list of grey phone numbers;
determining, by the system in response to the match, that the originating number has previously sent a previous text message to the grey phone number known to lack the capability to receive the short messaging service text messages; and
identifying, by the system, the originating number as a spammer based on the previous text message previously sent to the grey phone number known to lack the capability to receive the short messaging service text messages.

2. The method of claim 1, further comprising determining a grey ratio associated with the originating number.

3. The method of claim 2, further comprising comparing the grey ratio to a threshold.

4. The method of claim 1, further comprising determining all terminating numbers having an association with the originating number.

5. The method of claim 1, further comprising determining that a terminating number of the short messaging service text message is associated with a data-only device.

6. The method of claim 5, wherein the determining that the terminating number is associated with the data-only device is based on an international mobile equipment identity number.

7. The method of claim 1, further comprising periodically comparing the electronic records associated with the originating number to the entries in the electronic list of grey phone numbers.

8. A system comprising:
a processor; and
a memory device that stores executable instructions that, when executed by the processor, facilitate performance of operations, comprising:
comparing electronic call records associated with an originating number of a short messaging service text message to entries in an electronic list of grey phone numbers, each grey phone number in the electronic list of grey phone numbers associated with a data-only device;
determining a match between the electronic call records and a grey phone number in the electronic list of grey phone numbers;
determining that the originating number has previously sent a previous text message to the grey phone number; and
identifying the originating number as a spammer based on the previous text message previously sent to the grey phone number.

9. The system of claim 8, wherein the operations further comprise determining that a terminating number of the short messaging service text message is associated with the data-only device.

10. The system of claim 9, wherein the determining that the terminating number is associated with the data-only device is based on an international mobile equipment identity number.

11. The system of claim 8, wherein the operations further comprise determining a grey ratio associated with the originating number.

12. The system of claim 11, wherein the operations further comprise comparing the grey ratio to a threshold.

13. The system of claim 8, wherein the operations further comprise determining all terminating numbers having an association with the originating number.

14. The system of claim 8, wherein the operations further comprise periodically comparing the electronic call records associated with the originating number to the entries in the electronic list of grey phone numbers.

15. A non-transitory machine-readable storage medium comprising executable instructions which, responsive to being executed by a processor, facilitate performance of operations comprising:
receiving an originating number associated with a short messaging service text message;
retrieving electronic call records associated with the originating number associated with the short messaging service text message;
comparing the electronic call records associated with the originating number to entries in an electronic list of grey phone numbers, each grey phone number in the electronic list of grey phone numbers associated with a device not expected to receive short messaging service text messages;
determining a match between the electronic call records and a grey phone number in the electronic list of grey phone numbers;
determining that the originating number has previously sent a previous text message to the grey phone number; and
identifying the originating number as a spammer based on the previous text message previously sent to the grey phone number.

16. The non-transitory machine-readable storage medium of claim 15, wherein the device not expected to receive the short messaging service text messages is a data-only device.

17. The non-transitory machine-readable storage medium of claim 15, wherein the device not expected to receive the short messaging service text messages is a machine-to-machine communication device.

18. The non-transitory machine-readable storage medium of claim 15, wherein the operations further comprise determining a grey ratio associated with the originating number.

19. The non-transitory machine-readable storage medium of claim 18, wherein the operations further comprise comparing the grey ratio to a threshold.

20. The non-transitory machine-readable storage medium of claim 15, wherein the operations further comprise determining all terminating numbers having an association with the originating number.

* * * * *